United States Patent
Matsuo

(10) Patent No.: US 11,977,803 B1
(45) Date of Patent: May 7, 2024

(54) INDUSTRIAL PRINTING SYSTEM, PRINT SERVER, AND VARIABLE PRINTING METHOD FOR DISTRIBUTED PROCESSING OF VARIABLE PRINTING FOR PRODUCTION PRINTING BY PEER-TO-PEER

(71) Applicant: KYOCERA Document Solutions Inc., Osaka (JP)

(72) Inventor: Taku Matsuo, Los Angeles, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/982,432

(22) Filed: Nov. 7, 2022

(51) Int. Cl.
*G06F 3/12* (2006.01)

(52) U.S. Cl.
CPC .......... *G06F 3/1282* (2013.01); *G06F 3/1203* (2013.01); *G06F 3/1261* (2013.01); *G06F 3/1285* (2013.01)

(58) Field of Classification Search
None
See application file for complete search history.

(56) References Cited

U.S. PATENT DOCUMENTS

| | | | |
|---|---|---|---|
| 2003/0128384 A1* | 7/2003 | Nelson | G06F 3/1217 358/1.15 |
| 2010/0079788 A1* | 4/2010 | Kodera | G06F 3/1211 358/1.15 |
| 2015/0156351 A1 | 6/2015 | Yamamoto | |

FOREIGN PATENT DOCUMENTS

JP 2015-107555 A 6/2015

* cited by examiner

*Primary Examiner* — Lennin R Rodriguezgonzalez
(74) *Attorney, Agent, or Firm* — Hawaii Patent Services; Nathaniel K. Fedde; Kenton N. Fedde

(57) ABSTRACT

Provided is a peer-to-peer industrial printing system that performs distributed processing in variable printing for production printing. The industrial printing system includes a plurality of print servers and performs variable printing for production printing. Each of the plurality of print servers has a variable attribute generation unit, a variable distribution unit, and a processing management unit. The variable attribute generation unit generates variable attribute information including record information, which is information about each record of variable data for the variable printing. The variable distribution unit distributes each record of the variable data to one of the plurality of print servers based on the variable attribute information generated by the variable attribute generation unit. The processing management unit transmits the job ticket including the record distributed by the variable distribution unit to the other print server that is distributed to request processing.

12 Claims, 5 Drawing Sheets

FIG. 4

```xml
<variable-data>
    <variable-recode>                                    ─┐
        <recode-number>1</recode-number>                  │
        <primary-key>CI-001</primary-key>                 │
        <pages>                                           │
            <start-page>1</start-page>                    │
            <end-page>10</end-page>                       ├─ 330-1
        </pages>                                          │
        <color>                                           │
            <color-mode>color</color-mode>                │
            <spot-color>PANTONE 639C</spot-color>         │
        </color>                                          │
        <resolution>1200</resolution>                     │
    </variable-recode>                                   ─┘
    <variable-recode>                                    ─┐
        <recode-number>2</recode-number>                  │
        <primary-key>CI-002</primary-key>                 ├─ 330-2
        <resolution>600</resolution>                      │
    </variable-recode>                                   ─┘
    ...
```

220

INDUSTRIAL PRINTING SYSTEM, PRINT SERVER, AND VARIABLE PRINTING METHOD FOR DISTRIBUTED PROCESSING OF VARIABLE PRINTING FOR PRODUCTION PRINTING BY PEER-TO-PEER

BACKGROUND

The present disclosure particularly relates to an industrial printing system, a print server, and a variable printing method that perform variable printing in industrial printing (production printing).

Among typical print systems that include a plurality of printers, there is a print system that performs so-called ubiquitous printing. In this system, when a print system including a plurality of printers (MFPs) receives a ubiquitous job from a PC that issued the job, the first MFP stores the print settings in memory if the print settings can be processed by its own print function, and if it cannot be processed, it is transferred to the next MFP. This processing is performed according to the predetermined order from the first MFP to the Nth MFP. This saves the ubiquitous job in the memory of the MFP that can process it. As a result, in the printing system, it is possible to reduce the waiting time until the user obtains the printed matter.

That is, in this typical technology, print data (job) is transferred to each MFP, and it is determined whether or not the transferred MFP itself can process the data.

On the other hand, in industrial printing called production printing, which uses a commercial (industrial) printing apparatus, the component members of the final product are produced by dividing the work into a plurality of processes. For example, in the case of bookbinding, a cover, a body (color), a body (black and white), a promotional item, a band, a shipping envelope, and the like, are processed as different jobs. Then, in the middle of the process, each job is combined and finished as a book as the final product.

Furthermore, in recent years, in digital printing for production printing, industrial printing called variable printing, in which output changes for each record, has been performed. The variable printing is used for personalized printed matter, and the like. The variable printing is one of the purposes for which printing companies have digital production printing apparatuses.

SUMMARY

An industrial printing system of the present disclosure is an industrial printing system having a plurality of print servers and performs variable printing for production printing, and each of the plurality of print servers including: a variable attribute generation unit that generates variable attribute information including record information that is information about each record of variable data for the variable printing; a variable distribution unit that distributes each record of the variable data to one of the plurality of print servers based on the variable attribute information generated by the variable attribute generation unit; and a processing management unit that transmits a job ticket including the record distributed by the variable distribution unit to other print server that is distributed to request processing.

A print server according to the present disclosure is a print server for an industrial printing system that performs variable printing for production printing, including: a variable attribute generation unit that generates variable attribute information including record information that is information about each record of variable data for the variable printing; a variable distribution unit that distributes each record of the variable data to other print server based on the variable attribute information generated by the variable attribute generation unit; and a processing management unit that transmits a job ticket including the record distributed by the variable distribution unit to the other print server that is distributed to request processing.

A variable printing method according to the present disclosure is a variable printing method performed by an industrial printing system having a plurality of print servers and performing variable printing for production printing, including the steps of: generating variable attribute information including record information that is information about each record of the variable data for variable printing; distributing each record of the variable data to one of the plurality of print servers based on the generated variable attribute information; and transmitting a job ticket including the distributed record to other print server that is distributed to request processing.

BRIEF DESCRIPTION OF THE DRAWING

FIG. 4 is a conceptual diagram of the variable attribute information as shown in FIG. 3.

DETAILED DESCRIPTION

<Embodiment>
[Configuration of Industrial Printing System X]

Figure 1:
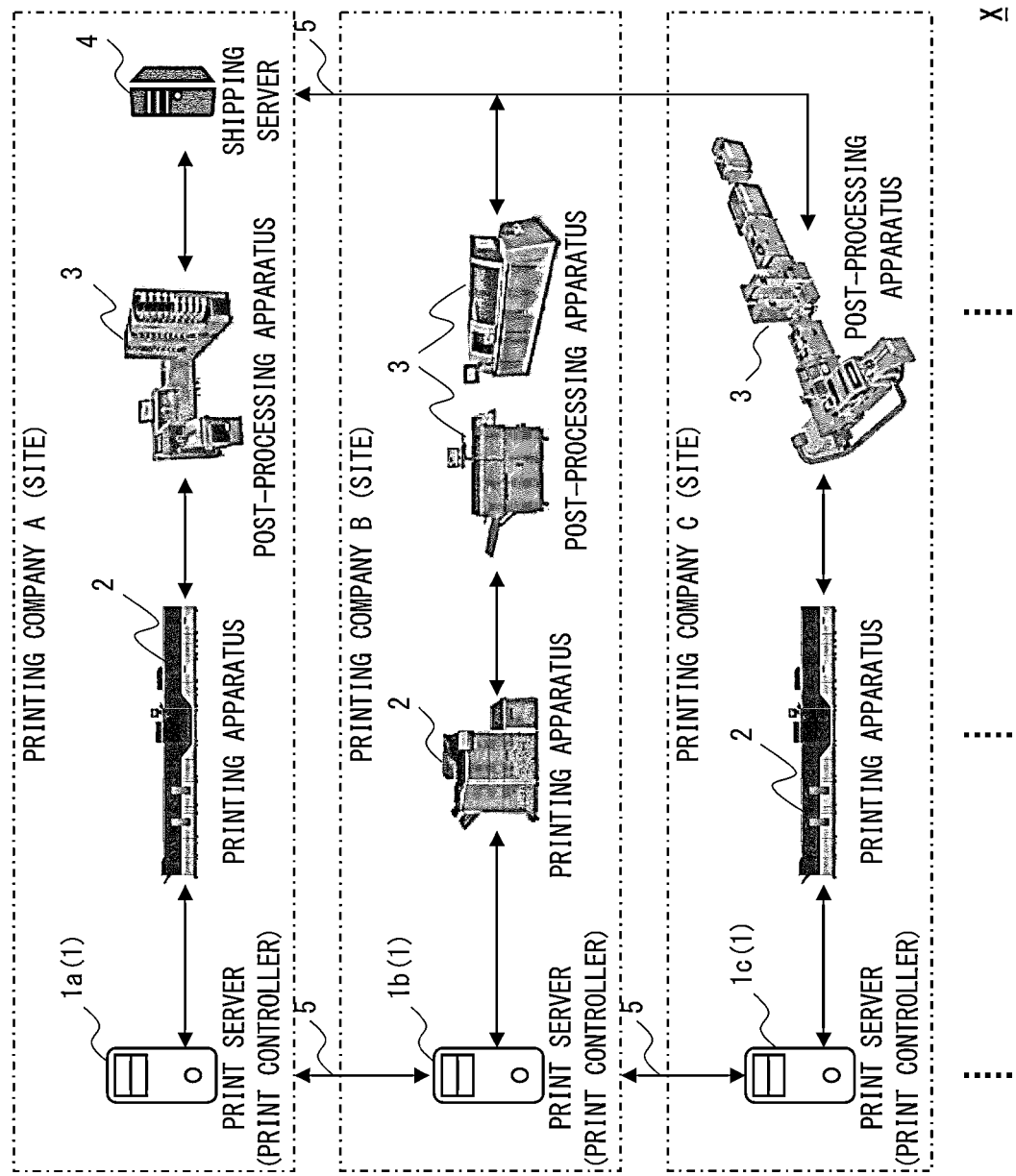
FIG. 1 is an example of a system configuration diagram of an industrial printing system according to an embodiment of the present disclosure.

Firstly, with reference to FIG. 1, an example of the overall system configuration of the industrial printing system X according to the present embodiment is described.

The industrial printing system X according to the present embodiment is a system that executes output in a printing process and a post-processing process (hereinafter also simply referred to as "printing") in industrial printing (production printing).

Here, in the industrial printing system X of the present embodiment, a final product such as a book to be output is defined as an "order", and each component of the order is defined as a job.

In the industrial printing system X, sites such as printing companies and printing factories are connected by a network 5 and cooperated each other. Each site includes a print server 1 and printing-related apparatuses (hereinafter referred to as "component apparatuses") such as a printing apparatus 2, a post-processing apparatus 3, a shipping server 4, and the like.

In FIG. 1, as an example of the inter-site cooperation, print servers 1a, 1b, 1c, . . . in the printing companies A, B, C, . . . and a shipping server 4 of printing company A are connected via a network 5 is shown.

Hereinafter, any one of these print servers 1a, 1b, 1c, . . . is simply referred to as the print server 1.

The print server 1 is an information processing apparatus for serving as a print controller that manages and controls component apparatuses provided in each site. The print server 1 is configured as a PC (Personal Computer) server, a dedicated machine, a general-purpose machine, or the like.

In the present embodiment, the print server 1 executes dedicated print management application software (hereinafter simply referred to as an "application") to perform distributed peer-to-peer processing for each record of the variable document data 200 (as refer to FIG. 3) for production printing. This print management application (hereinafter referred to as the "dedicated application") may be executed on a common platform that performs print design creation, user management, tenant management, security management, notification service for maintenance, prepress processing management, storage management of each document, component apparatus management, or the like.

Specifically, in production printing, the print server 1 transmits and receives various instructions and information to and from the printing apparatus 2, the post-processing apparatus 3, the shipping server 4, and the like. As a result, the print server 1 manages the status of each apparatus and requests job processing.

In the present embodiment, the print servers 1 includes the "own print server", which is a print server 1 that requests processing of the variable data 320 (as refer to FIG. 3), and "other print server", which is a print server 1 that receives the processing request. Then, a job request is made peer-to-peer between the own print server and the other print server.

At this time, the own print server requests the other print server to print or post-process at least some of the records for each record of variable printing. Then, the own print server or the other print server that executes the processing distributes the processing of the job to each component apparatus in the site and causes it to be executed.

The printing apparatus 2 is, for example, a digital production printing apparatus that performs small-volume (small-lot) printing, or an automated offset printing apparatus that performs printing processes such as offset printing for large-volume (multiple-lot) printing.

The printing apparatus 2 at each site according to the present embodiment may differ in size, quality, color profile, recordable range, or the like of recording paper used in the printing process.

The post-processing apparatus 3 is various apparatuses for executing post-processing processes such as folding, collating, bookbinding, cutting, bookbinding, or the like of recording papers printed by the printing apparatus 2.

The post-processing apparatus 3 at each site according to the present embodiment may also differ in the contents and range of processes that can be executed in the post-processing step.

The shipping server 4 is a server that manages the shipping of orders sent from each site after the printing process or post-processing process is completed.

In the present embodiment, an example using the shipping server 4 provided at the site of company A is described, but a shipping server may be provided at other sites.

The network 5 is a LAN (Local Area Network), a wireless LAN (Wi-Fi), a WAN (Wide Area Network), a mobile telephone network, an industrial network, a voice telephone network, other dedicated lines, or the like. The network 5 can transmit and receive various commands and data to and from each apparatus. Furthermore, the print server 1 and each component apparatus may also be connected via a LAN or the like of the network 5. In addition, the network 5 may be configured with a VPN (Virtual Private Network), or the like.

In addition, a plurality of these apparatuses may exist according to the application, the scale of printing, and the like. Each apparatus can be connected to the print server 1 by various protocols via the network 5, LAN, or the like. Alternatively, the print server 1 and each apparatus may be directly connected by wire using various interfaces.

Further, each site may have other component apparatuses managed by the print server 1. Other component apparatuses include, for example, a terminal for manuscript submission, a terminal for design proofreading, a prepress apparatus, and the like.

Furthermore, an administrator terminal or a general terminal used by an administrator or a user may be connected via the network 5 from inside and outside each site. As a result, each print server 1 can be accessed by the administrator or the user by using a web browser, terminal, dedicated application, or the like, on the administrator terminal or a console, or the like, and can perform job acquisition, print design, submission, management of prepress processing, confirmation of progress status, processing requests, and the like.

[Control Configuration of Print Server 1]

Figure 2:
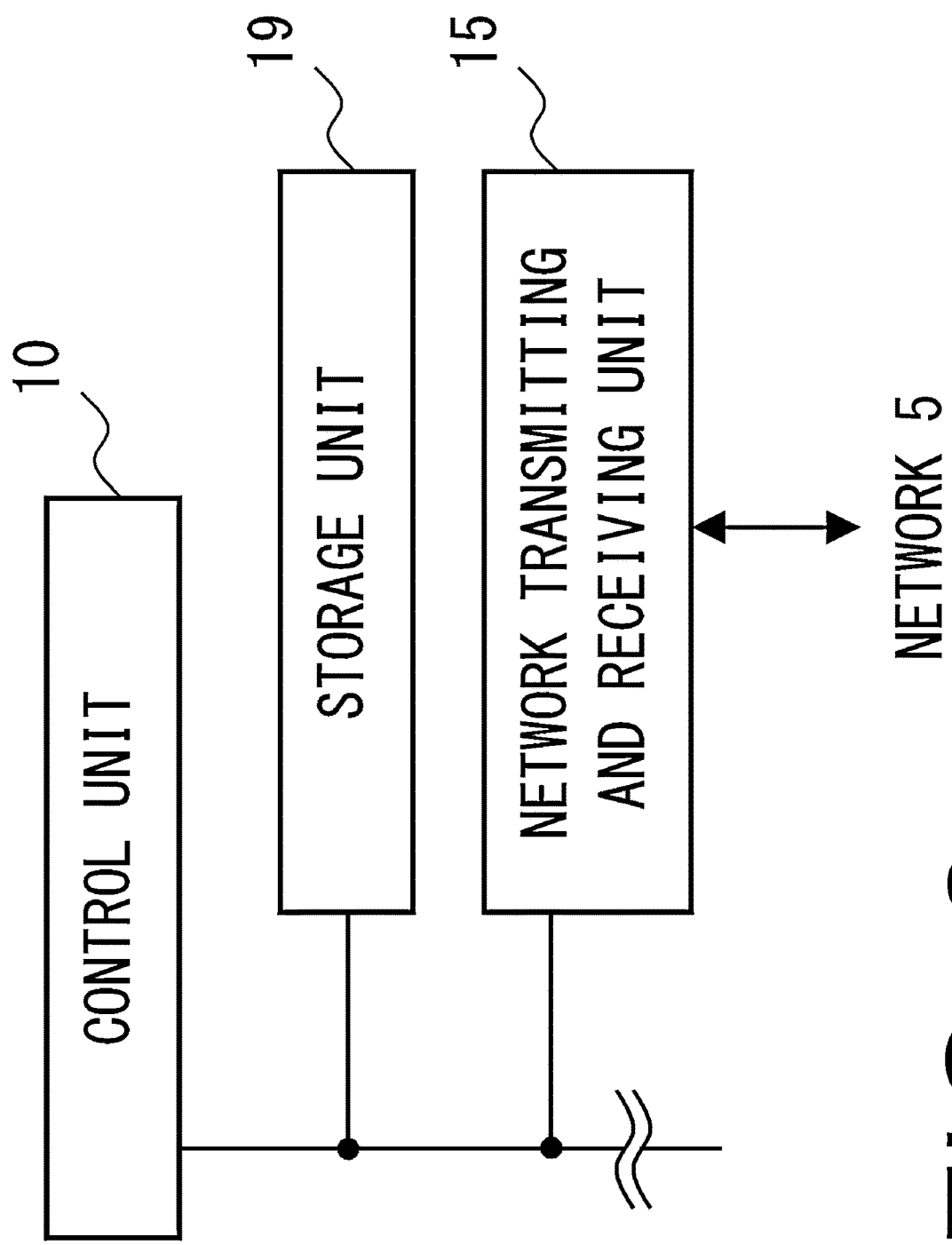
FIG. 2 is a block diagram showing the control configuration of the print server as shown in FIG. 1.

Next, with referring to FIG. 2, the control configuration of the print server 1 is described.

The print server 1 includes a control unit 10, a network transmitting and receiving unit 15, a storage unit 19, and the like. Each unit is connected to the control unit 10 and controlled in operation by the control unit 10.

The control unit 10 includes GPP (General Purpose Processor), CPU (Central Processing Unit), MPU (Micro Processing Unit), DSP (Digital Signal Processor), GPU (Graphics Processing Unit), ASIC (Application Specific Integrated Circuit, application-specific processors), or the like The control unit 10 reads the control program stored in the ROM or HDD of the storage unit 19, expands the control program in the RAM, and executes it, thereby operating as each unit of the function blocks as described later. Further, the control unit 10 controls the entire apparatus according to instruction information input from the administrator terminal or console.

The network transmitting and receiving unit 15 is a network connection unit including a LAN board, a wireless transmitting and receiving apparatus, or the like, for connecting to the external network 5.

The network transmitting and receiving unit 15 transmits and receives data through a data communication line, and it transmits and receives voice signals through a voice telephone line.

The storage unit 19 is a non-transitory recording medium such as semiconductor memory, which is ROM (Read Only Memory) or RAM (Random Access Memory) or the like, or HDD (Hard Disk Drive), or the like.

The control program for controlling the operation of the print server 1 is stored in the ROM or HDD of the storage unit 19. The control program includes an OS (Operating System), middleware on the OS, services (daemons), various applications, database data, and the like. Among these, the various applications include the printing process management application described above. Furthermore, the storage unit 19 may also store account settings for users and administrators of the industrial printing system X, other data, and the like.

In addition, the control unit 10 may be integrally formed, such as a CPU having a built-in GPU, chip-on-module package, SOC (System On a Chip), or the like.

Also, the control unit 10 may have a built-in RAM, ROM, flash memory, or the like.

[Functional Configuration of Print Server 1]

Figure 3:
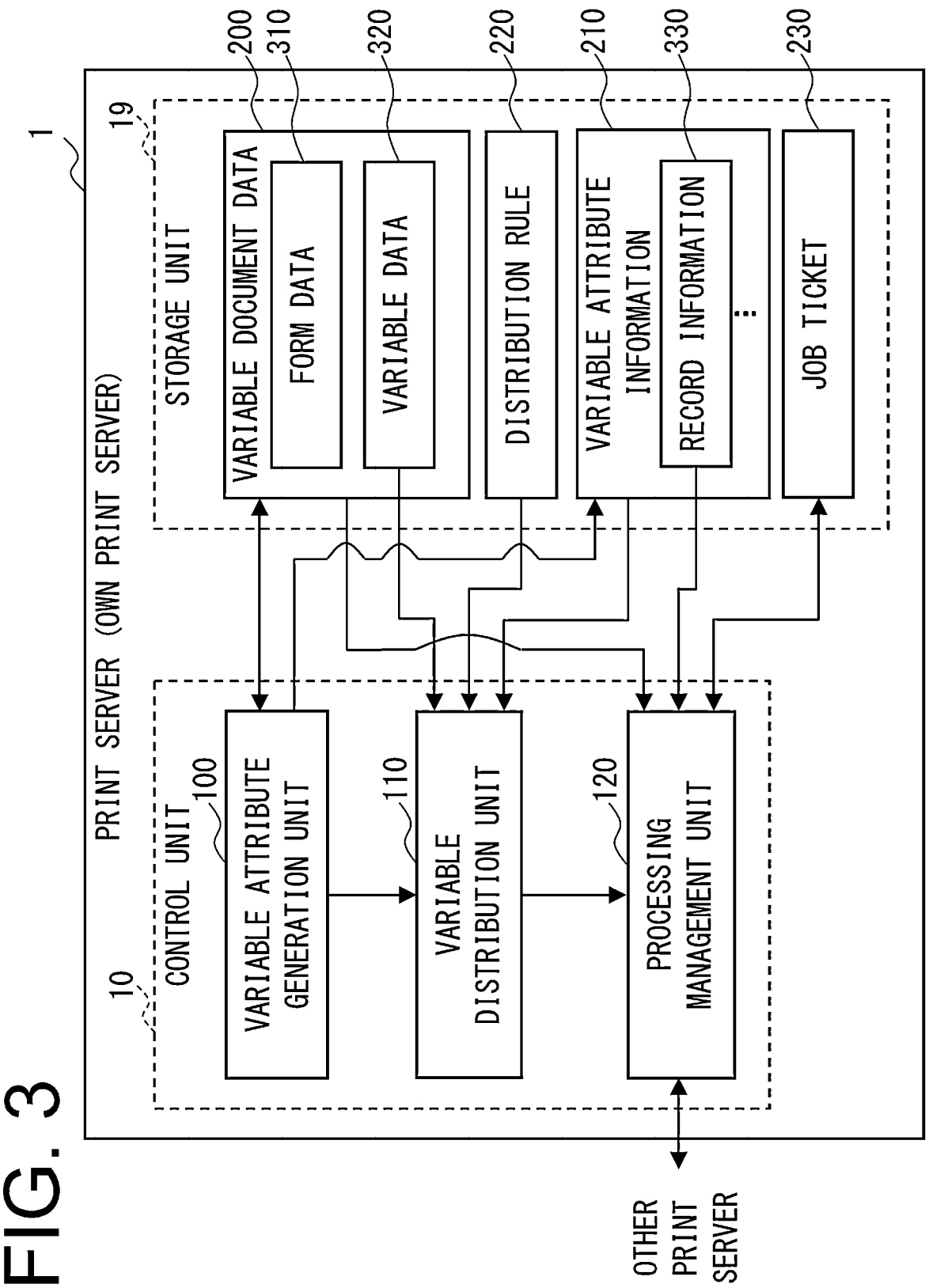
FIG. 3 is a block diagram showing the functional configuration of the print server as shown in FIG. 1.

Here, with reference to FIG. 3, an example of a functional configuration of the print server 1 is described.

The control unit 10 of the print server 1 includes a variable attribute generation unit 100, a variable distribution unit 110 and a processing management unit 120.

The storage unit 19 stores variable document data 200, variable attribute information 210, a distribution rule 220, and a job ticket 230.

The variable attribute generation unit 100 generates variable attribute information 210 including record information 330, which is information about each record of variable data 320.

The variable attribute generation unit 100 may generate the variable attribute information 210 when generating the variable data 320 for variable printing.

The variable distribution unit 110 distributes each record of the variable data 320 to one of the plurality of print servers 1 (the other print server) based on the variable attribute information 210 generated by the variable attribute generation unit 100. The destination to which the processing of each record is distributed is hereinafter referred to as a "distribution destination".

At this time, the variable distribution unit 110 can distribute each record to the other print server as a distribution destination based on the distribution rule 220. Specifically, the variable distribution unit 110 can distribute each record to the other print server as the distribution destination according to primary key information. On the other hand, the variable distribution unit 110 can also distribute each record to the other print server as the distribution destination based on the processing attribute information.

Furthermore, if the other print server does not support the processing of the processing attribute information, the variable distribution unit 110 can change the distribution itself or change the contents of printing and post-processing so as to support the processing.

The processing management unit 120 generates a job ticket 230 including the record distributed by the variable distribution unit 110, and it transmits the job ticket 230 to the other print server as the distribution destinations to request processing.

The variable document data 200 is data of a variable printing job (hereinafter just referred to as a "variable job") in which a variable document used in variable printing and various data related thereto are collected.

For example, the variable document data 200 may be described in JDF (Job Description Format) and/or JMF (Job Messaging Format).

The variable attribute information 210 is data indicating attributes of each record of the variable data 320 for variable printing. This attribute includes information about each record and content information. The variable attribute information 210 is generated as information of each record or content when the variable data 320 is generated.

In the present embodiment, the variable attribute information 210 may be data in a format that is easy to handle as a database similar to the variable data 320 as described later.

The distribution rule 220 is setting information of a distribution condition regarding for job distribution when each record of the variable data 320 is distributed to other print servers.

The distribution rule 220 may be a file written in a script language or macro language, or the like.

The job ticket 230 is setting data for requesting a printing or post-processing job.

Specifically, the job ticket 230 includes form data 310 as described later, data of each of distributed records of variable data 320, and each setting. Each setting may include a sub-setting in the workflow, which is an order setting. The sub-setting may be, for example, necessary settings such as imposition position, post-processing, or the like. Further, in the present embodiment, job ticket 230 may include data generated from a workflow template for printing according to the order.

The job ticket 230 may also be written in JDF and/or JMF.

(Details of Variable Document Data 200)

Then, the details of the variable document data 200 are described.

In the present embodiment, the variable document data 200 includes form data 310 and variable data 320. These data may be included in the variable document data 200 as attribute data.

The form data 310 is data including a common form for performing variable printing. The common form becomes data of portions that basically do not change at the time of printing. Specifically, the form data 310 may be data such as PDF (Portable Document Format), PDL (Page Description Language), PPML (Personalized Print Markup Language) in XML (Extensible Markup Language) format, or the like. Among these, the PDF may be PDF/X, which is a subset of the standard PDF defined by the International Organization for Standardization (ISO 15930), a simpler PDF, or the like.

Furthermore, the form data 310 may include, for example, image data such as jpg, gif, BMP, PNG, TIFF, or the like, other document data, and other type data. Additionally, the form data 310 may include layout information that defines the layout, or the like, on the page. The layout information may include format information such as the position (coordinates) and size of the form on the page, font size of the variable data 320, left alignment, center alignment, and right alignment, and the like.

Furthermore, the form data 310 may also include a definition of an element of the variable data 320, data describing an item of the elements, data indicating a target of an attribute, and the like.

The variable data 320 is data for variable output that changes the print content at the time of printing. The variable data 320 may be embedded in the variable document data 200, for example, as a table format including multiple records, a database format such as XML, or the like.

Alternatively, the variable data 320 may be added separately as a file in a format, which is easy to handle as a database. In such case, the variable data 320 may be a database such as a tab-separated or comma-separated file, a spreadsheet application file, other types of database files, a list file, or the like.

In addition, the variable document data 200 may include job type, project (order) name, various types of processing attribute information, a print resource, and the like. The processing attribute information may be set the number of copies, whether or not collation is performed, whether or not recording is performed, the number of mm to be cut, the print direction, the print state, the priority, and the like. Among these, the job type includes a job in the printing process (printing job) and a job in the post-processing process (post-processing job). The print resource is information on various resources necessary for printing instructions such as an ICC profile, and the like. The other resource data required for printing are also included in the print resource.

(Details of Variable Attribute Information 210)

Then, the details of the variable attribute information 210 are described.

In the present embodiment, the variable attribute information 210 includes record information 330 for each record.

The record information 330 is information about each record of the variable data 320. The record information 330 includes a record number, a primary key for identifying the record, and record processing attribute information.

With reference to FIG. 4, the details of the record information 330 is described.

FIG. 4 shows record information 330-1 and record information 330-2 as an example, including the following elements and attributes:

"recode-number" indicates the record number of the variable data 320.

"primary-key" is the variable data value, which is the primary key. The primary key is designated as a distribution condition by a distribution rule 220, which is described later. In this example, a value that can identify a record, such as a customer ID, or the like, is set in the primary key.

"pages" indicates the page number(s) of the record in the variable data 320. For example, pages such as "pages 1 to 10" are designated by "start-page" to "end-page" as the page number(s).

"color" is a data value of color information. The color information is an example of the processing attribute information. As for the color information, for example, color or monochrome can be specified as a color-mode. Furthermore, the color information may include setting values such as spot-color, special color designation, or the like.

"resolution" is the resolution value of the variable data 320. The resolution is also an example of processing attribute information. For the resolution, for example, in the case of a record containing high-resolution content, this high-resolution value is set. For example, if the record contains content of 1200 dpi, the set value is "1200 dpi", or the like.

In addition, the record information 330 may include information such as an expiration date, a print component (content) ID (content ID), and content source data as other processing attribute information. Furthermore, when the record is performed raster-image-processor (hereinafter abbreviated as "RIP" or "rasterize"), the record information 330 may include its attribute and rasterized data itself.

Further, at least part of the variable attribute information 210 may be described in a format compatible with JDF and/or JMF.

(Details of Distribution Rule 220)

Then, the details of the distribution rule 220 is described.

In the present embodiment, the distribution rule 220 sets a combination or priority of distribution conditions such as a distribution condition based on the primary key of the variable attribute information 210, a distribution condition based on the processing attribute information, and a printing attribute change condition, and the like.

Specifically, as the distribution condition based on the primary key, it is possible to set the distribution of the job according to information of the primary key. For example, as the primary key, it is possible to specify distribution by using "membership type", which is a classification such as VIP member, general member, new member, or the like.

The distribution condition based on the processing attribute information can be set for distributing the job according to information regarding the processing capability of the printing apparatus 2, such as color information, data resolution, or the like. For example, it is possible to set such that monochrome-designated records are sorted so as to be printed by the printing apparatus 2 that is a monochrome printer. Further, it is possible to set a record including high resolution content such as 1200 dpi to be distributed to the other print server having a printing apparatus 2 capable of high-resolution printing.

The print attribute change condition can be set to change the distribution destination or change the content of printing or post-processing according to the above-described primary key, processing attribute information, or the like.

Specifically, for example, even if coated paper is specified in the processing attribute information of the variable document data 200, it is possible to set such that the record with the primary key of "general member" is printed on plain paper, or the like.

Further, as a print attribute change condition, if the other print server cannot print with the processing attribute information indicated in the variable attribute information 210 (does not support printing), a condition for changing the print attribute can be set. That is, for the other print server that does not support the print attribute specified in the job, it is possible to change the paper settings according to this print attribute change condition.

Specifically, for example, for other print servers that do not support finishing specified in the record information 330 of the variable document data 200 or the variable attribute information 210, settings such as changing the post-processing can be made. As an example, even if the job ticket 230 specifies "perfect binding", it is possible to set such that records with a primary key of "general member" are printed with "saddle stitch binding".

The distribution rule 220 may be a distribution rule that combines or prioritizes the distribution conditions as described above. Also in this case, the distribution rule 220 can be set by using a script language, a macro language, or the like.

For example, a sorting rule with a membership type such as "VIP member", or the like, as the primary key can be set as follows:

If Primary Key=="VIP Member"
        Then Distribution Printer="Print Server 1*a*"
    If Primary Key=="General Member"
        Then Media Catalog="Plain: White"
            Distribution Printer="Print Server 1*b*"

Alternatively, for example, in the case of a "VIP member" and a "color & high resolution" sorting rule, the following can be set:

If Primary Key=="VIP Member" && Color Mode=="Color" && Resolution=="1200 dpi"
        Then Distribution Printer="Print Server 1*a*"
        Else Distribution Printer="Print Server 1*b*"

The distribution rule 220 can also set more complicated rules by using a script language, a macro language, or the like, in addition to the above.

Here, the control unit 10 of the print server 1 is caused to function as the variable attribute generation unit 100, the variable distribution unit 110, and the processing management unit 120 by executing the control program stored in the storage unit 19.

Also, each unit of the print server 1 described above serves as a hardware resource for executing the variable printing method of the present disclosure.

In addition, a part or any combination of the functional configurations described above may be configured in terms of hardware or circuits by using an IC, programmable logic, FPGA (Field-Programmable Gate Array), or the like.

[Variable Distribution Process by Print Server 1]

Figure 5:
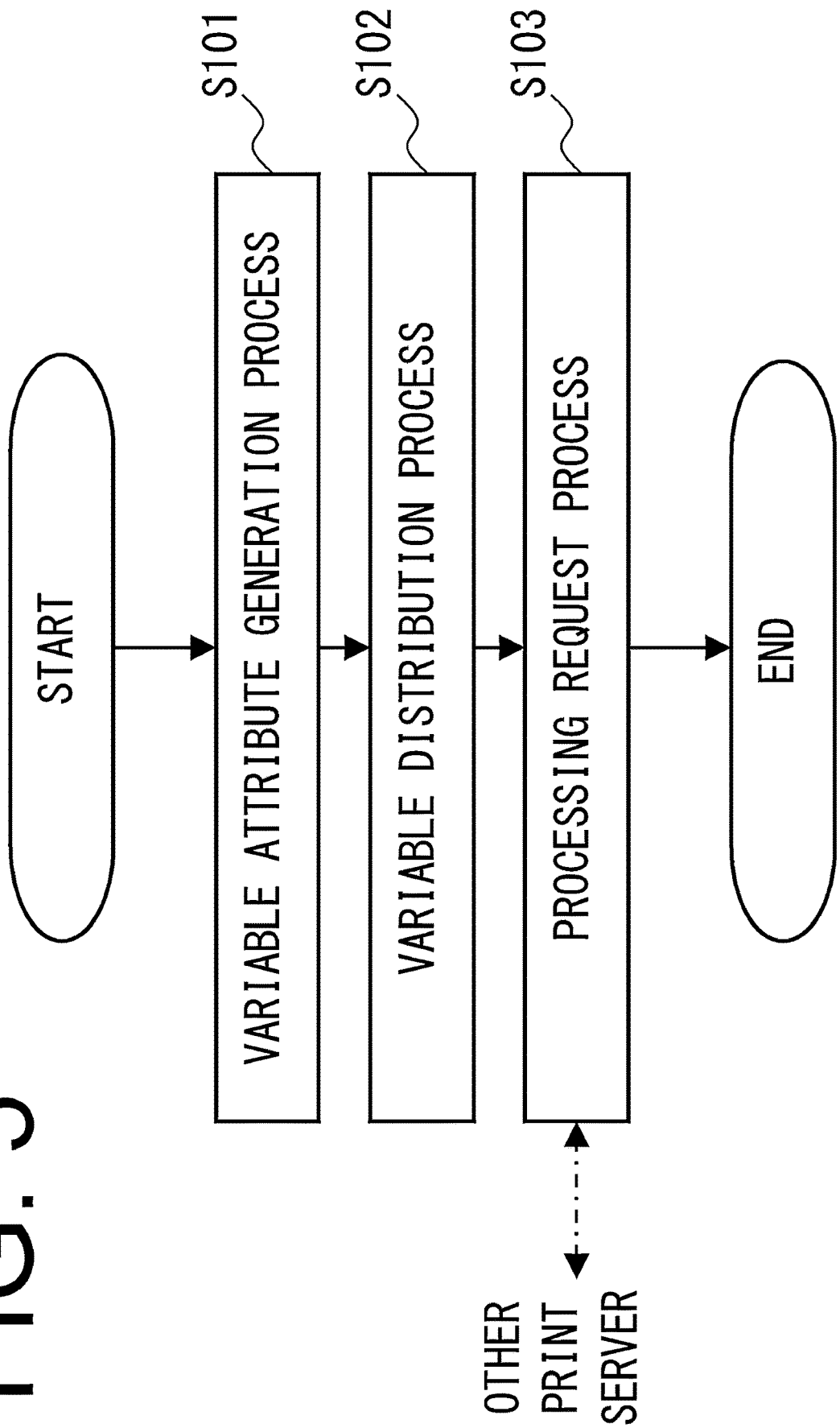
FIG. 5 is a flowchart of a variable distribution process according to the embodiment of the present disclosure.

Next, with reference to FIGS. 4 and 5, a variable distribution process for executing the variable printing method by the print server 1 according to the embodiment of the present disclosure is described.

In the variable distribution process of the present embodiment, variable data 320 for variable printing is generated. When generating the variable data 320, variable attribute information 210 including record information 330, which is information about each record, is generated. Then, based on the generated variable attribute information 210, each record of the variable data 320 is distributed to one of a plurality of print servers. Then, the job ticket 230 including the distributed records is sent to the other print servers that is distributed to request processing.

In the variable distribution process according to the present embodiment, as a representative example, the print server 1a of the printing company A (site) is used as the own print server (processing request side). In this example, the control unit 10 of the print server 1a mainly executes the program stored in the storage unit 19 in cooperation with each unit and by using hardware resources.

In the following, with reference to the flowchart of FIG. 4, details of the variable distributed process are described step by step.

(Step S101)

Firstly, the variable attribute generation unit 100 performs variable attribute generation process.

The variable attribute generation unit 100 acquires variable document data 200 from an administrator terminal, a prepress apparatus, or the like. This variable document data 200 is to be subjected to peer-to-peer distributed processing. Here, when acquiring the variable document data 200, the variable attribute generation unit 100 generates variable attribute information 210 including record information 330, which is information about each record.

The variable document data 200 and the variable attribute information 210 may be generated on the GUI (Graphical User Interface) screen of the dedicated application by causing the administrator terminal to execute a web browser or a dedicated application.

(Step S102)

Then, the variable distribution unit 110 performs variable distribution process.

The variable distribution unit 110 performs distribution by selecting the print server 1 to which the processing request for each record of the variable data 320 is requested as a distribution destination based on the variable attribute information 210 generated by the variable attribute generation unit 100.

At this time, the variable distribution unit 110 may select the other print server as the distribution destination for each record based on the distribution rule 220.

Specifically, the variable distribution unit 110 can distribute each record according to the primary key information. For example, in the above example, the other print server as the distribution destination may be selected for each record by the setting of "VIP member" and "general member".

Alternatively, the variable distribution unit 110 may distribute each record based on the processing attribute information. For example, in the above example, the other print server to be the distribution destination may be selected for each record based on color information, resolution, expiration date, print component ID, and the like.

Furthermore, if the other print server does not support the processing of the processing attribute information, the variable distribution unit 110 can change the distribution itself or change the contents of printing and post-processing so as to support the processing. Specifically, the variable distribution unit 110 can select the other print server for printing by the monochrome printing apparatus 2 in the case of a "general member". Alternatively, the variable distribution unit 110 can re-select the other print server as a distribution destination or change the contents of the job ticket 230.

When selecting the other print server as the distribution destination, the variable distribution unit 110 may refer to the capability table stored in the storage unit 19. This capability table includes capability data having resource information for printing and post-processing of each print server 1 and component apparatuses connected with this print server 1. Here, if the capability data of the print server 1 to be selected is not included in the capability table, the variable distribution unit 110 may acquire the capability data of the print server 1 at each site from the print server 1.

Then, the variable distribution unit 110 may refer to the capability table and the distribution rule 220 as described above to select which print server to use as the other print server.

Furthermore, the variable distribution unit 110 may be able to reserve (specify) which component apparatus to use in the other print server, which is selected. In this case, it is also possible to specify whether to use the digital production printing apparatus or the offset printing apparatus.

In addition, the variable distribution unit 110 can print the record by the printing apparatus 2 connected with its own print server.

(Step S103)

Then, the processing management unit 120 performs processing request process.

The processing management unit 120 generates the job ticket 230 including records distributed by the variable distribution unit 110. Then, the processing management unit 120 transmits the job ticket 230 to the other print server as the distribution destination to request processing. As a result, the processing management unit 120 can distribute the variable data 320 in record units and process them at the other site.

Here, the processing management unit 120 of the own print server can also adjust the processing request based on the status of the schedule information.

When the job ticket 230 is received in the other print server, if the job type is a printing job, the other print server instructs the selected printing apparatus 2 to print the record included in the job ticket 230. As a result, the printing apparatus 2 can print out the distributed record of the variable document data 200.

On the other hand, if the job ticket 230 is a post-processing job, the other print server causes the post-processing apparatus 3 to perform post-processing. As a result, the post-processing apparatus 3 can also perform post-processing based on the job ticket 230.

With the above, it completes the variable distribution process according to the embodiment of the present disclosure.

As configured in this way, the following effects can be obtained.

In typical production printing, there is a case where a plurality of printing apparatuses distributes and processes printing in order to process a large amount of printing in a short period of time. Such distributed processing requires a management server that transmits and manages print data to a plurality of printing apparatuses.

In other words, with typical technology, a system for distributed processing centered on a management server must be built by necessity.

On the other hand, the variable printing is the most characteristic digital printing job, and one of the purposes for which printing companies introduce digital production printing apparatuses. Since variable printing is used for personalized printed matter, and the like, it is often the case that a large amount of printing is required.

However, in a system for distributed processing centered on the management server as described above, the distributed processing of variable printing with printing apparatuses at other sites as distribution destinations cannot be performed. Also, a typical peer-to-peer printing technology has not been able to perform variable printing for production printing.

On the other hand, the industrial printing system X according to the present embodiment is an industrial printing system having a plurality of print servers 1 and performs variable printing for production printing, and each of the plurality of print servers 1 including: a variable attribute generation unit 100 that generates variable attribute information 210 including record information 330 that is information about each record of variable data 320 for the variable printing; a variable distribution unit 110 that distributes each record of the variable data 320 to one of the plurality of print servers 1 based on the variable attribute information 210 generated by the variable attribute generation unit 100; and a processing management unit 120 that transmit a job ticket 230 including the record distributed by the variable distribution unit 110 to other print server that is distributed to request processing.

By configuring like this, the need for a management server for distributed processing is eliminated, and a peer-to-peer type industrial printing system capable of flexibly performing distributed processing between the print servers 1 and capable of efficiently distributing and printing a large number of variable jobs can be provided. That is, in the industrial printing system X according to the present embodiment, there is no need to separately prepare the special management server for distributed processing of the variable document data 200.

Specifically, by generating variable attribute information 210 including record information 330 for variable data 320, according to this variable attribute information 210, a variable job including a large number of pages can be optimally distributed instead of simple page division or random division.

Also, by generating the variable attribute information 210 when generating the variable data 320, the variable attribute information 210 can be used to efficiently select distribution destinations, or the like.

In the industrial printing system X according to the present embodiment, the variable distribution unit 110 distributes each record to one of the plurality of print servers 1 based on distribution rules 220 in which a distribution condition is set.

By configuring in this way, flexible allocation for each record becomes possible according to the set distribution rule 220.

In the industrial printing system X according to the present embodiment, the record information 330 includes primary key information for identifying the record, and the variable distribution unit 110 distributes each of the record to any one of the plurality of print servers 1 according to the primary key information.

By configuring in this way, an appropriate distribution according to the user's intention can be performed. For example, according to the primary key information, "VIP members", "general members", or the like, can be distributed, easily.

In the industrial printing system X according to the present embodiment, the record information 330 includes record processing attribute information, and the variable distribution unit 110 distributes each of the records to one of the plurality of print servers 1 based on the processing attribute information.

By configuring in this way, according to information on various processing attributes such as color information, resolution, expiration date, an ID of print component, and the like, the records can be distributed, flexibly. Therefore, appropriate distribution can be performed according to the output characteristics, cost, or the like, for the printing apparatus 2 at each site.

In the industrial printing system X according to the present embodiment, the variable distribution unit 110 changes the distribution itself so as to support processing when the other print server does not support the processing of processing attribute information.

By configuring in this way, it is possible to re-select an appropriate print server 1 corresponding to the processing of the processing attribute information as the other print server of the distribution destination from the plurality of print servers 1. Therefore, even if the variable data 320 includes a record that cannot be processed by one distribution destination, it can be handled by distributing it to the other distribution destination.

[Other Embodiments]

In the above embodiment, an example is described in which the variable distribution unit 110 selects the other print server as the distribution destination that matches the distribution rule 220 from the plurality of print servers 1 by using the capability table.

However, the variable distribution unit 110 may select the other print server as the distribution destination in consideration of the schedules of the plurality of print servers 1, the number and performance of component apparatuses, costs, and other requirements according to the distribution rule 220.

Furthermore, the variable distribution unit 110 can also consider factors not included in the distribution rule 220, such as the number of requested records, or the like, at the time of selection.

Further, the other print server can be re-selected by acquiring error processing results such as that consumables or paper has run out on the other print server.

By configuring in this way, it becomes possible to distribute records more appropriately. As a result, it is possible to reduce the time and effort of manual adjustment, improve processing efficiency, and reduce running costs. Further, by requesting processing based on the schedule, it is possible to adjust processing requests due to delays and the like.

In the above-described embodiment, an example of generating the job ticket 230 according to the distribution condition and requesting the other print server to process the job ticket 230 has been described.

However, it is also possible for the own print server to change the distribution condition itself in accordance with the result of processing in other print server, schedule change, and the like. Specifically, as distribution conditions that can be processed when adjusting the processing request due to delay, for example, the number of records to be processed, the number of pages, the color profile to be used, or the like, can be changed.

By configuring in this way, even if trouble occurs, the job can be executed by distributed processing.

In addition, the variable distribution unit 110 does not always select one print server 1 as the other print server to be a distribution destination, but it can select a plurality of appropriate print servers.

In this case, selecting distribution destination according to the order of priority or to select it randomly from the plurality of selected print servers 1 may be configurable in the distribution rule 220.

Alternatively, if the processing attribute information can be processed by a general printing apparatus 2 or a general post-processing apparatus 3, the variable distribution unit 110 may send the job ticket 230, randomly, without selecting the print server 1 as the distribution destination in the first place.

By configuring in this way, even variable data 320 that requires a large amount of printing or post-processing can be distributed and processed, appropriately.

Further, in the above-described embodiment, an example of distributing the printing job mainly for variable printing has been described. However, a post-processing job can be selected and distributed to the other print server as the distribution destination.

In such case, different groups of print servers 1 may be used to select the distribution destination for the printing process and for the post-processing process. Furthermore, both the job for printing job and the other job for the post-processing job may be processed in a distributed manner.

By configuring in this way, post-processing jobs can be distributed and processed more efficiently.

Further, the configuration and operation of the above-described embodiment are examples, and needless to say, they can be modified and executed as appropriate without departing from the aim of the present disclosure.

What is claimed is:

1. An industrial printing system having a plurality of print servers and which performs variable printing for production printing, and each of the plurality of print servers comprising:
    a variable attribute generation unit configured to generate variable attribute information including record information that is information about each record of variable data for the variable printing;
    a variable distribution unit configured to distribute each record of the variable data to one of the plurality of print servers based on the variable attribute information generated by the variable attribute generation unit; and
    a processing management unit configured to transmit a job ticket including the each record distributed by the variable distribution unit to other print server that is distributed to request processing; wherein:
    the record information includes primary key information for identifying the each record; and
    the variable distribution unit is configured to distribute each of the records to one of the plurality of print servers according to the primary key information.

2. The industrial printing system according to claim 1, wherein:
    the variable distribution unit is configured to distribute each of the records to one of the plurality of print servers based on distribution rules in which a distribution condition is set.

3. The industrial printing system according to claim 1, wherein:
    the record information includes processing attribute information of the each record; and
    the variable distribution unit is configured to distribute each of the records to one of the plurality of print servers based on the processing attribute information.

4. The industrial printing system according to claim 3, wherein:
    the variable distribution unit is configured to change the distribution so as to support processing when the other print server does not support processing of the processing attribute information.

5. A print server for an industrial printing system that performs variable printing for production printing, comprising:
    a variable attribute generation unit configured to generate variable attribute information including record information that is information about each record of variable data for the variable printing;
    a variable distribution unit configured to distribute each record of the variable data to other print server based on the variable attribute information generated by the variable attribute generation unit; and
    a processing management unit configured to transmit a job ticket including the each record distributed by the variable distribution unit to the other print server that is distributed to request processing; wherein:
    the record information includes primary key information for identifying the each record; and
    the variable distribution unit is configured to distribute each of the records to one of a plurality of print servers according to the primary key information.

6. The print server according to claim 5, wherein:
    the variable distribution unit is configured to distribute each of the records to one of the plurality of print servers based on distribution rules in which a distribution condition is set.

7. The print server according to claim 5, wherein:
    the record information includes processing attribute information of the each record; and
    the variable distribution unit is configured to distribute each of the records to one of the plurality of print servers based on the processing attribute information.

8. The print server according to claim 7, wherein:
    the variable distribution unit is configured to change the distribution so as to support processing when the other print server does not support processing of the processing attribute information.

9. A variable printing method performed by an industrial printing system having a plurality of print servers and performing variable printing for production printing, comprising the steps of:
    generating variable attribute information including record information that is information about each record of variable data for variable printing;
    distributing each record of the variable data to one of the plurality of print servers based on the generated variable attribute information; and
    transmitting a job ticket including the each distributed record to other print server that is distributed to request processing; wherein:
    the record information includes primary key information for identifying the each record; and
    the step of distributing comprises distributing each of the records to one of the plurality of print servers according to the primary key information.

10. The variable printing method according to claim 9, wherein:
the step of distributing comprises distributing each of the records to one of the plurality of print servers based on distribution rules in which a distribution condition is set.

11. The variable printing method according to claim 9, wherein:
the record information includes processing attribute information of the record; and
the step of distributing comprises distributing each of the records to one of the plurality of print servers based on the processing attribute information.

12. The variable printing method according to claim 11, further comprising:
changing the distribution so as to support processing when the other print server does not support processing of the processing attribute information.

* * * * *